(12) United States Patent
    Baheti

(10) Patent No.: US 10,393,266 B2
(45) Date of Patent: Aug. 27, 2019

(54) HIGH PRESSURE CIRCUMFERENTIAL LIFT-OFF SEAL

(71) Applicant: Kaydon Ring & Seal, Inc., Baltimore, MD (US)

(72) Inventor: Sanjay K. Baheti, Brookeville, MD (US)

(73) Assignee: Kaydon Ring & Seal, Inc., Baltimore, MD (US)

( * ) Notice: Subject to any disclaimer, the term of this patent is extended or adjusted under 35 U.S.C. 154(b) by 8 days.

(21) Appl. No.: 15/637,442

(22) Filed: Jun. 29, 2017

(65) Prior Publication Data

US 2019/0003591 A1    Jan. 3, 2019

(51) Int. Cl.

| F16J 15/34 | (2006.01) |
|---|---|
| F16J 15/00 | (2006.01) |
| F16J 15/42 | (2006.01) |
| F16J 15/44 | (2006.01) |
| F16J 15/3212 | (2016.01) |

(52) U.S. Cl.
    CPC .......... F16J 15/004 (2013.01); F16J 15/42 (2013.01); F16J 15/442 (2013.01); F16J 15/3212 (2013.01)

(58) Field of Classification Search
    CPC  F16J 15/004; F16J 15/44; F16J 15/441; F16J 15/442; F16J 15/443; F16J 15/445
    See application file for complete search history.

(56) References Cited

U.S. PATENT DOCUMENTS

| 5,509,664 A * | 4/1996 | Borkiewicz | ............ F16J 15/442 |
|---|---|---|---|
| | | | 277/543 |
| 6,145,840 A * | 11/2000 | Pope | ...................... F16J 15/346 |
| | | | 277/348 |
| 8,905,408 B2 * | 12/2014 | Garrison | ................. F01D 11/02 |
| | | | 277/348 |

* cited by examiner

Primary Examiner — Gilbert Y Lee
(74) Attorney, Agent, or Firm — Mark Ussai; SKF USA Inc. Patent Dept.

(57) ABSTRACT

A seal assembly includes a plurality of arcuate seal bodies spaced about a central axis and coupled to form an annular seal disposeable within a housing first chamber. Each seal body has an inner circumferential sealing surface for sealingly against a rotatable member outer surface and an axial end having a radial sealing surface sealingly engageable with a housing radial surface to separate the first chamber and a second housing chamber. One or more lift ramps extend outwardly from the body inner surface and generate an outwardly directed force on the seal body when the inner member rotates within the seal. An elongated projection extends axially from the body end, has radially inner and outer surfaces, and is disposeable within the housing second chamber. The projection outer surface is exposable to fluid pressure within the second chamber to generate a pressure differential between the projection inner and outer surfaces.

19 Claims, 14 Drawing Sheets

US 10,393,266 B2

HIGH PRESSURE CIRCUMFERENTIAL LIFT-OFF SEAL

BACKGROUND OF THE INVENTION

The present invention relates to seals, and more particularly to segmented lift-off seal assemblies for sealing about rotatable members.

Circumferential lift-off seal assemblies are generally known and include two or more arcuate segments coupled together to form an annular seal disposed about a rotatable member, such as a shaft or a runner/sleeve mounted to the shaft. The inner surface of the seal engages the outer surface of the rotatable member in a static state and the seal is configured to "lift" or displace radially-outwardly from the rotatable member during dynamic operation. Typically, lift ramps or pads are provided on the seal inner surface, or grooves are provided on the outer surface of the rotatable member, such that fluid is pressurized by the ramps or grooves to cause the outward displacement of the seal segments. However, in high-pressure applications, the lifting force generated by the ramps or grooves may either be insufficient to displace the seal body from the shaft, or delay the lifting of the seal segments, such that the seal becomes damaged or worn by sliding contact with the rotatable member.

SUMMARY OF THE INVENTION

In one aspect, the present invention is a circumferential lift-off seal assembly for sealing generally between an inner member rotatable about a central axis and an outer housing. The inner member has an outer circumferential surface and the housing has a first chamber, a second chamber and a radial surface partially defining the first chamber and located adjacent to the second chamber. The seal assembly comprises a plurality of generally arcuate seal bodies spaced circumferentially about the central axis and coupled together to form a generally annular seal disposeable substantially within the housing first chamber. Each seal body has an inner circumferential sealing surface sealingly engageable with the inner member outer surface, first and second axial ends, the second axial end having a radial sealing surface sealingly engageable with the housing radial surface so as to fluidly separate the first and second housing chambers, and opposing first and second circumferential ends. The first end of each seal body is coupled with the second end of an adjacent one of the other seal bodies. Further, at least one lift ramp extends radially-outwardly from the body inner surface and is configured to generate a radially-outwardly directed force on the seal body when the inner member rotatably displaces within the seal. An elongated projection extends generally axially outwardly from the body second axial end and has opposing radially inner and radially outer surfaces. The projection is disposeable within the housing second chamber such that that the projection outer surface is exposable to fluid pressure within the second chamber to generate a pressure differential between the projection inner and outer surfaces.

In another aspect, the present invention is again a circumferential lift-off seal assembly for sealing generally between an inner member rotatable about a central axis and an outer housing, as described in the preceding paragraph and further including the following structural features. A circumferential pressure groove extends generally radially-outwardly from the body inner surface and generally between the first and second circumferential ends. The groove is generally disposed axially between the at least one lift ramp and the body second axial end and is fluidly coupleable with the first housing chamber. Further, at least one feed slot extends generally axially between the body first end and the pressure groove and is fluidly coupled with the at least one lift ramp.

In a further aspect, the present invention is mechanical assembly comprising an inner member rotatable about a central axis and having an outer circumferential surface, an outer housing having a first chamber, a second chamber and a radial surface partially defining the first chamber and located adjacent to the second chamber, and a high-pressure lift-off seal assembly. The seal assembly includes a plurality of generally arcuate seal bodies spaced circumferentially about the central axis and coupled together to form a generally annular seal disposed substantially within the housing first chamber. Each seal body has an inner circumferential sealing surface sealingly engageable with the inner member outer surface, first and second axial ends, the second axial end having a radial sealing surface sealingly engageable with the housing radial surface so as to fluidly separate the first and second housing chambers, and opposing first and second circumferential ends. The first end of each seal body is coupled with the second end of an adjacent one of the other seal bodies. At least one lift ramp extends radially-outwardly from the body inner surface and is configured to generate a radially-outwardly directed force on the seal body when the inner member rotatably displaces within the seal. Further, at least one elongated projection extends generally axially outwardly from the body second axial end and has opposing radially inner and radially outer surfaces. The projection is disposed within the housing second chamber such that that the projection outer surface is exposed to fluid pressure within the second chamber to generate a pressure differential between the projection inner and outer surfaces.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
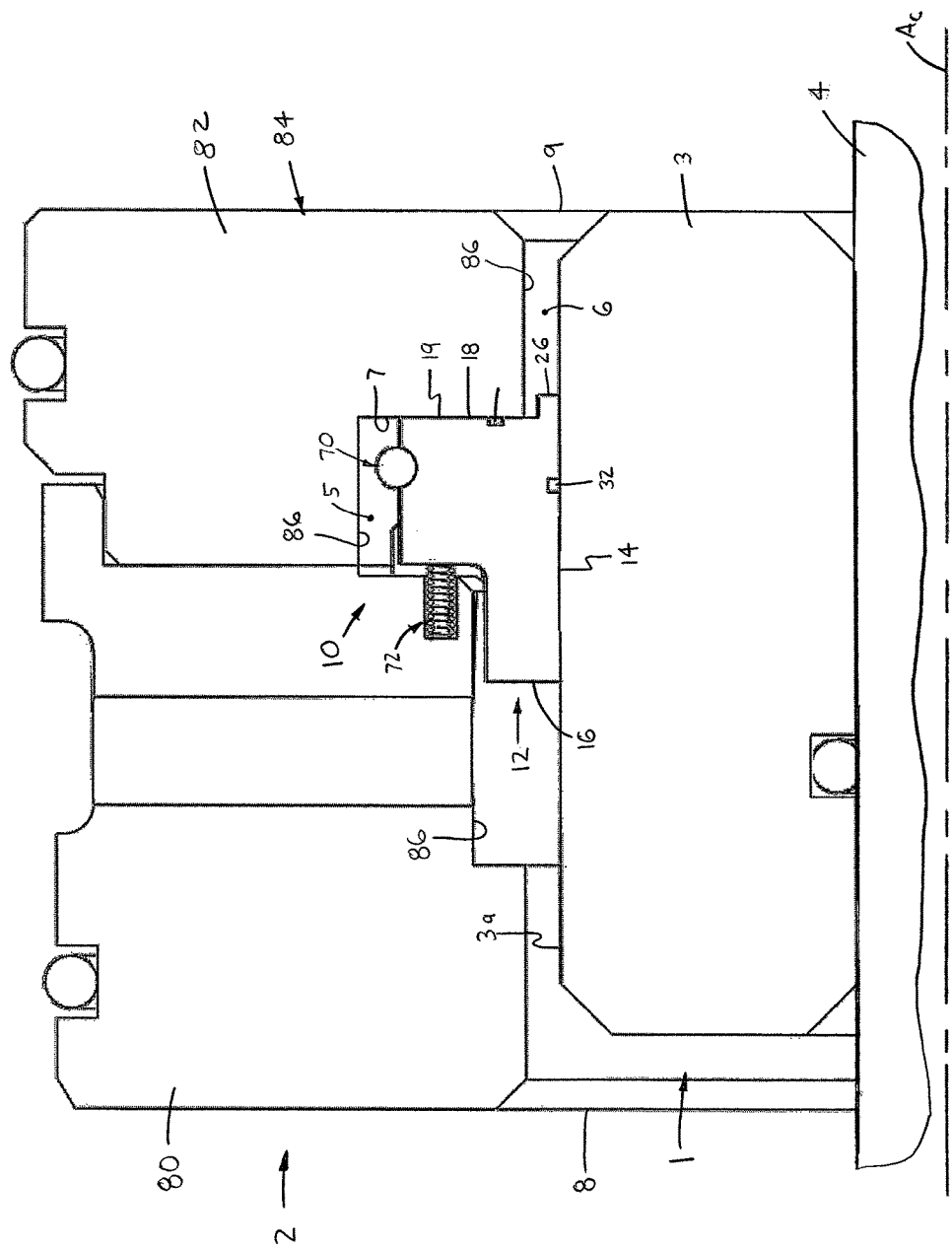
FIG. 1 is a broken-away, axial cross-sectional view of a mechanical assembly including a seal assembly in accordance with the present invention, the seal assembly being disposed about a runner mounted to a shaft and disposed within a housing.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-15 a circumferential lift-off seal assembly 10 for sealing generally between a rotatable inner member 1 and an outer housing 2. The inner member 1 is rotatable about a central axis $A_C$ and is preferably a generally cylindrical sleeve or runner 3 mounted about shaft 4 and having an outer circumferential surface 3a, as generally depicted herein, but the seal assembly 10 may alternatively seal directly about the shaft 4 or about any other member mounted about or connected to the shaft 4. The housing 2 has a first chamber 5, a second chamber 6 and a radial surface 7 partially defining the first chamber 5 and located adjacent to the second chamber 6. The seal assembly 10 is preferably used in substantially high pressure applications, such as for example in a centrifugal compressor, with the first chamber 5 being fluidly coupled with an inlet 8 and containing fluid at a relatively high pressure range (e.g., 30 psig-180 psig), and the second chamber 6 being fluidly coupled with an outlet 9 and containing fluid generally at ambient pressure, or at least at a pressure substantially lower than the pressure within the first chamber 5.

Figure 10:
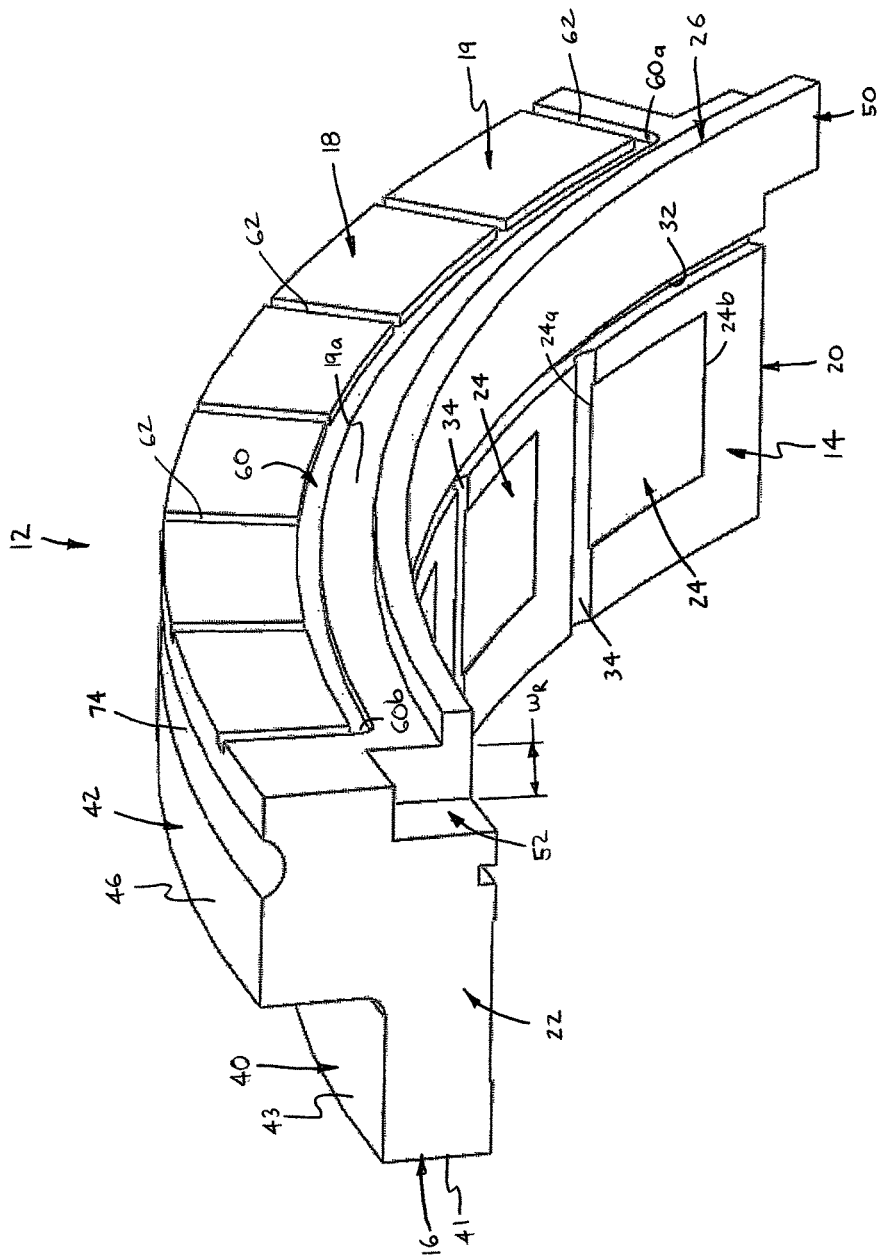
FIG. 10 is a perspective view of the seal body from a second circumferential end.
Figure 11:
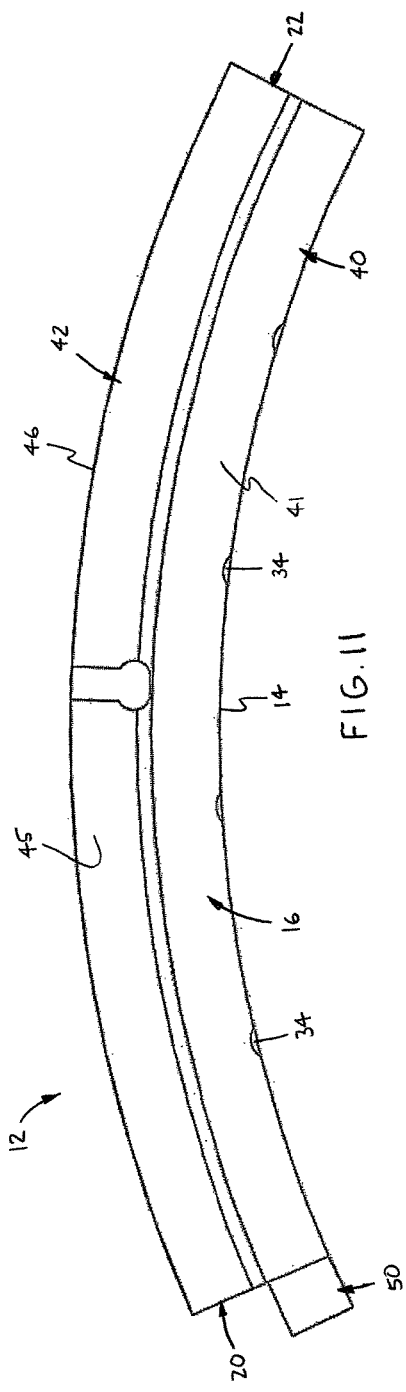
FIG. 11 is a plan view of a first axial end of the seal body.
Figure 12:
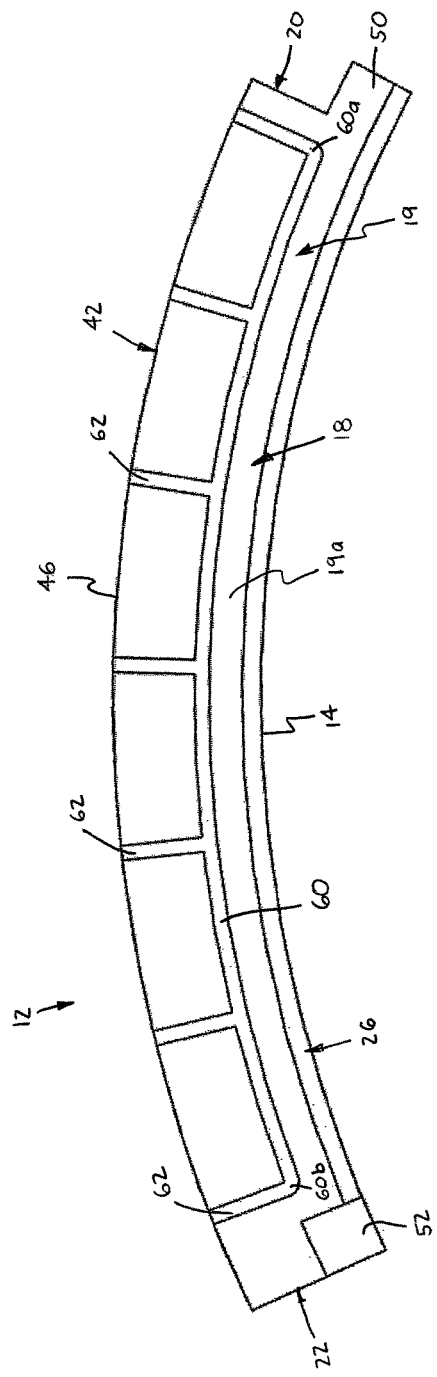
FIG. 12 is a plan view of a second axial end of the seal body.

The seal assembly 10 basically comprises a plurality of generally arcuate seal bodies 12 or "segments" spaced circumferentially about the central axis $A_C$ and coupled together to form a generally annular seal 11. The seal 11 is disposed/disposeable substantially within the housing first chamber 5 and is preferably "loosely" coupled to the housing 2 by one or more pins 92 (FIG. 15) so as to substantially prevent angular displacement of the seal 11 about the central axis $A_C$. Each seal body 12 has an inner circumferential sealing surface 14 sealingly engageable with the inner member outer surface 3a, first and second axial ends 16, 18, respectively, and opposing first and second circumferential ends 20, 22, respectively. Each seal body second axial end 18 has a generally radial sealing surface 19 sealingly engageable with the housing radial surface 7 so as to fluidly separate the first and second housing chambers 5, 6, most preferably a lower portion 19a of the end surface 19 as indicated in FIGS. 10 and 12. Further, the first circumferential end 20 of each seal body 12 is coupled with the second circumferential end 22 of an adjacent one of the other seal bodies 12 to form the seal 11, as described in further detail below. Preferably, each seal body 12 is formed of a carbon graphite or a ceramic, but may be formed of any other appropriate material.

Figure 13:
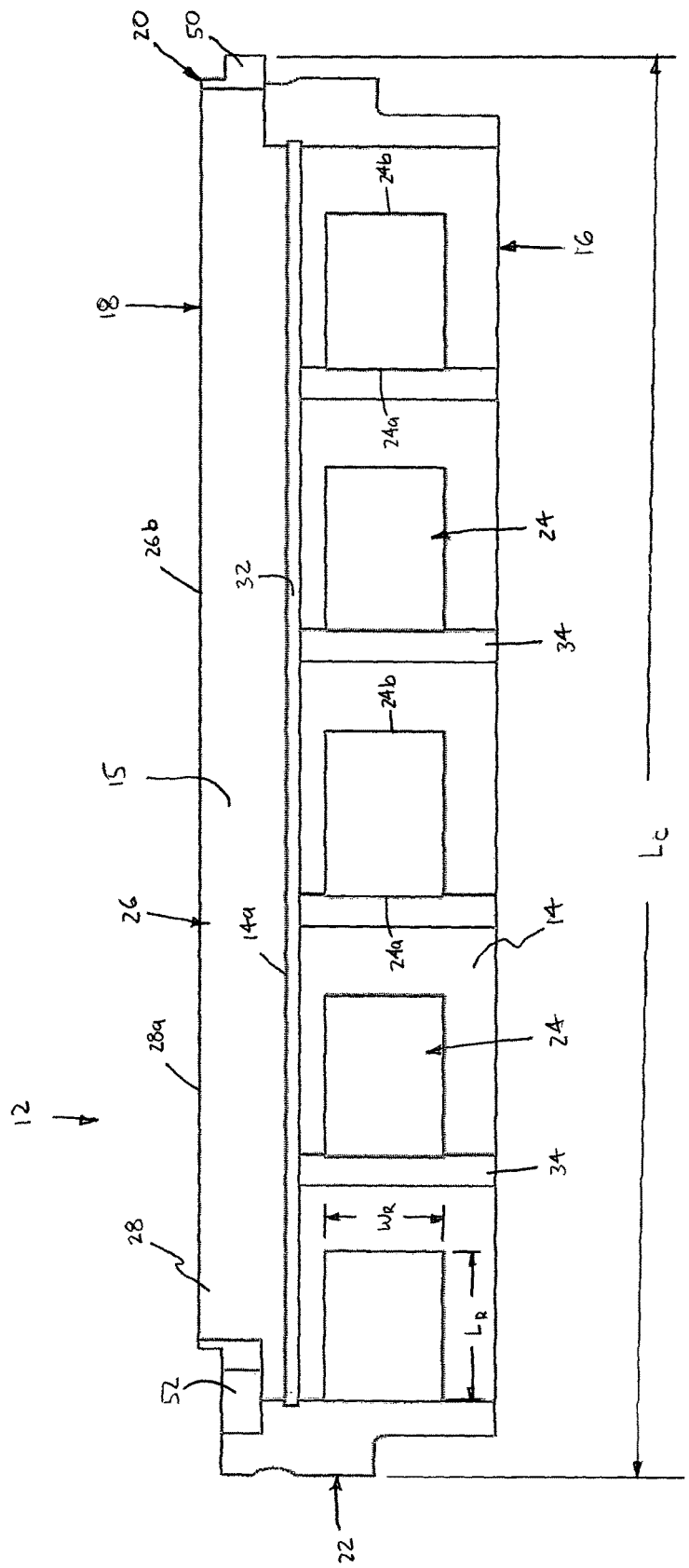
FIG. 13 is a plan view of an inner circumferential end of the seal body.

Referring to FIGS. 6, 9, 10 and 13, each seal body 12 further has at least one and preferably a plurality of lift ramps 24 each extending radially-outwardly from the body inner surface 14 and configured to generate a radially-outwardly directed force $F_R$ (FIG. 6) on the seal body 12 to bias the body 12 radially-outwardly when the inner member 1 rotatably displaces within the seal 11. Preferably, each lift ramp 24 is generally rectangular and tapers radially-inwardly and generally linearly from a first depth at a ramp inlet end 24a to a second, lesser depth (i.e., shallower) at a ramp end 24b (FIGS. 10 and 13), such that fluid entering the ramp 24 becomes pressurized during rotation of the inner member 1. However, each ramp 24 may alternatively have two or more sections each with a depth that tapers at different rates or a single section that taper in a generally curvilinear manner. Preferably, each lift ramp 24 has a first depth (not indicated) at the ramp inlet 24a that ranges between about five ten thousandths of an inch (0.0005") to about seven thousandths of an inch (0.007"), a circumferential length $L_R$ within a range of about two hundred fifty thousandths of an inch (0.250") and four hundred thousandths of an inch (0.400"), and a width $w_R$ within a range of one hundred thousandths of an inch (0.100") and three hundred thousandths of an inch (0.300"), as indicated in FIG. 13. Although the ramps 24 are shown in the drawing figures as uni-directional and generate ramp lift force $F_R$ only when the inner member 1 rotates in one direction, the seal bodies 12 may alternatively be provided with bi-directional ramps to generate lift force $F_R$ when the inner member 1 rotates in either direction.

Referring now to FIGS. 1, 3-6, 8-10, and 12-14, each seal body 12 further has at least one elongated lift projection 26 extending generally axially outwardly from the second axial end 18 of each seal body 12. Each lift projection 26 has a first axial end 26a integrally formed with the seal body second axial end 18, a second axial end 26b spaced axially from the first end 26a, and opposing radially inner and radially outer surfaces 28, 30, respectively. The lift projections 26 each preferably have an inside radius $R_P$ substantially equal to an inside radius $R_S$ of the seal inner surface 14 (see FIG. 5). As such, the projection inner surface 28 is substantially continuous along the axis $A_C$ with at least an adjacent portion of the seal body inner surface 14. Further, each lift projection 26 is disposeable within the housing second chamber 6 such that that the projection outer surface 30 is exposable to fluid pressure within the second chamber 6 to generate a pressure differential between the projection inner and outer surfaces 28, 30, as described in further detail below.

Referring to FIGS. 1, 3-6, 8-10 and 13, each seal body 12 further has a circumferential pressure groove 32 extending generally radially outwardly from the body inner surface 14 and generally between the first and second circumferential ends 20, 22. Each pressure groove 32 is generally disposed axially between the one or more lift ramp(s) 24 and the body second axial end 18. Further, at least one and preferably a plurality of feed slots 34 each extends generally axially between the body first axial end 16 and the pressure groove 32 and are each fluidly coupled with a separate one of the lift ramps 24. As such, the pressure groove 32 is fluidly coupleable with the first housing chamber 5, i.e., through the feed slot(s) 34. With this structure, a pressure gradient PG (FIG. 6) extends axially between an edge 14a of the seal body inner surface 14 adjacent to the groove 32 and an edge 28a of the projection inner surface 28 adjacent to the projection outer end 28b, this region defining a "bore dam" 15, whenever fluid pressure within the first chamber 5 is greater than fluid pressure within the second chamber 6, as described in greater detail below.

Figure 6:
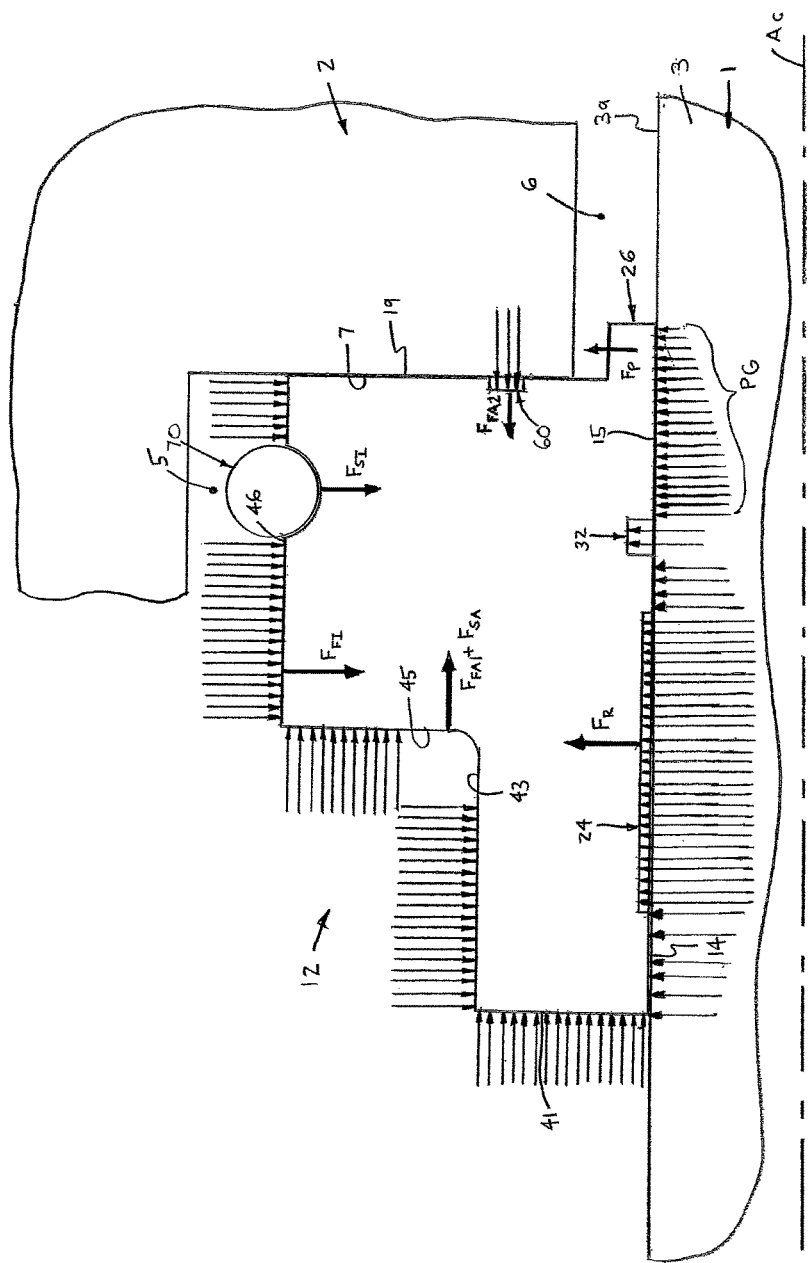
FIG. 6 is a broken-away, more diagrammatic view of the seal assembly of FIG. 3, depicting the effects of fluid pressure exerted on various sections of the seal body.
Figure 7:
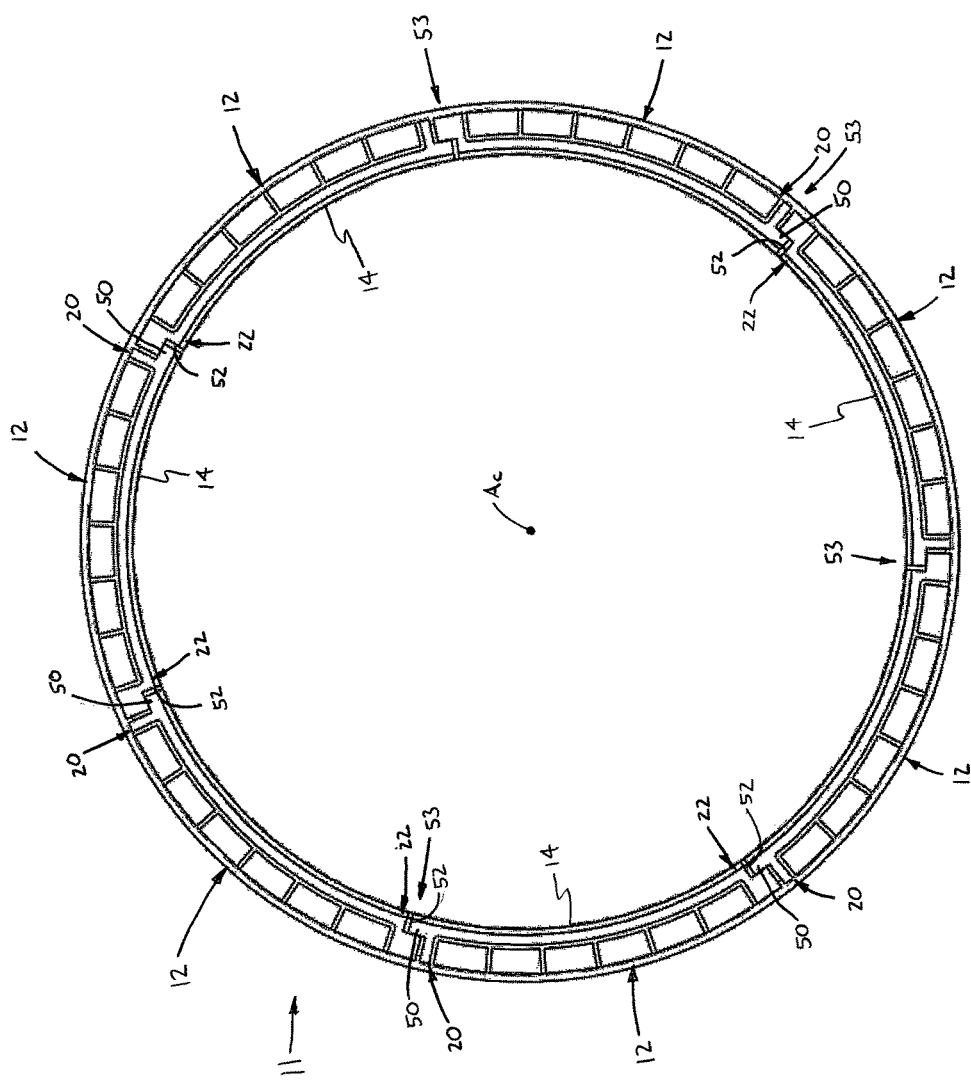
FIG. 7 is an axial end view of a seal formed of several coupled seal bodies.

Referring particularly to FIG. 6, fluid pressure at the inner edge 14a of the bore dam 15 is substantially at the high pressure within the housing first chamber 5 (e.g., 30 psig-180 psig) and pressure at the dam outer edge 28a is at the lower pressure within the second chamber 6 (e.g., ambient pressure). As such, the pressure gradient PG is established within the bore dam 15 and acts outwardly on the seal body 12 and the integral projection 26, while pressure on the projection outer surface 30 is substantially lower. This pressure differential on the lift projection 26 generates a net radially-outwardly directed force $F_P$ on the projection 26, and thus also the seal body 12. The outward force $F_P$ exerted on each projection 26 counteracts or reduces the effect of the radially-inwardly directed force $F_{FI}$ on the seal body 12 caused by high pressure fluid within the first housing chamber 5 acting on the seal body outer surfaces 43, 46, as described below, as well as an inwardly biasing force $F_{SI}$ of a spring 70, as also discussed below.

Figure 4:
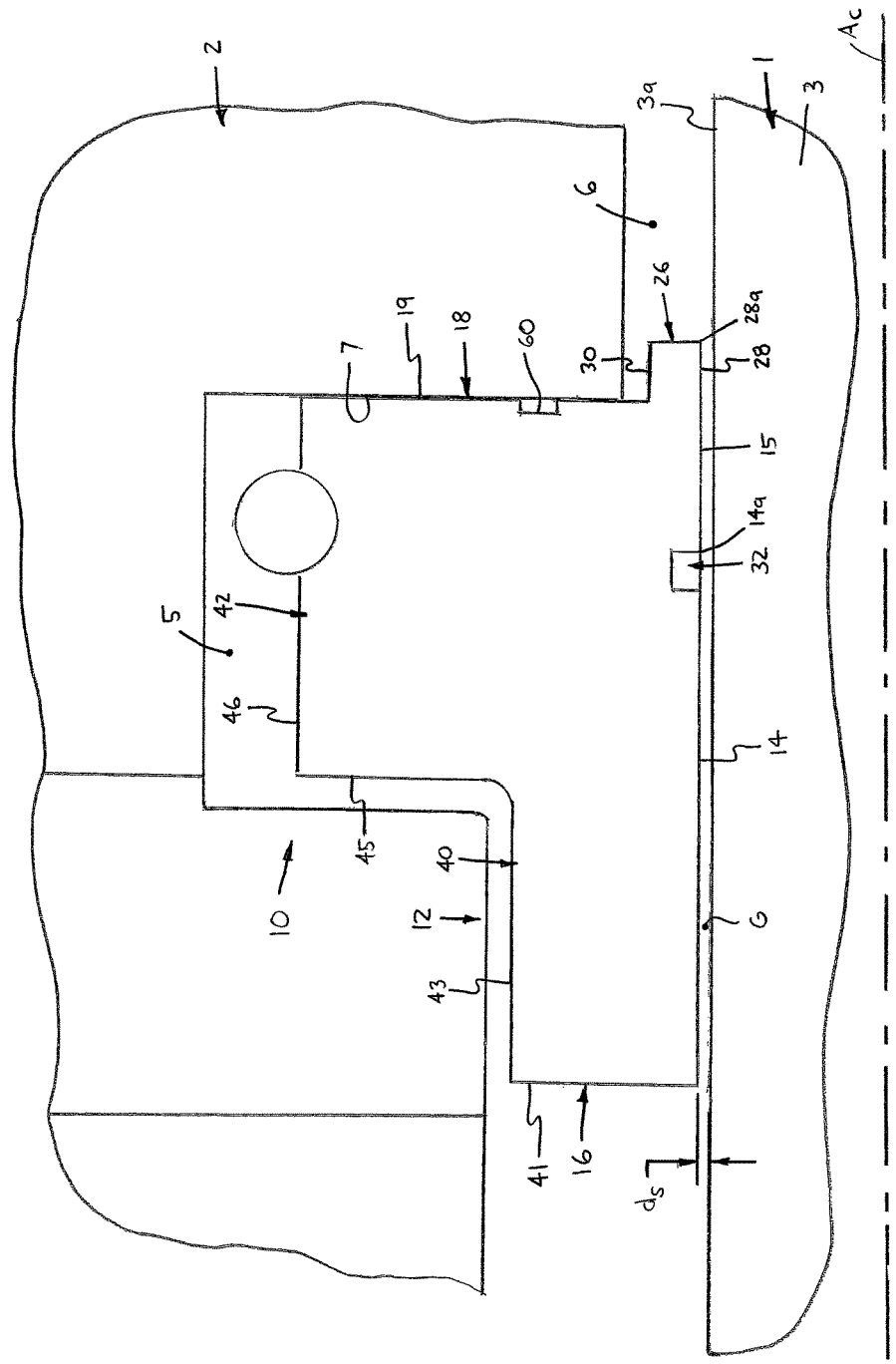
FIG. 4 is another view of the assembly of FIG. 3, shown in a dynamic state with the seal body spaced from the inner member outer surface.
Figure 5:
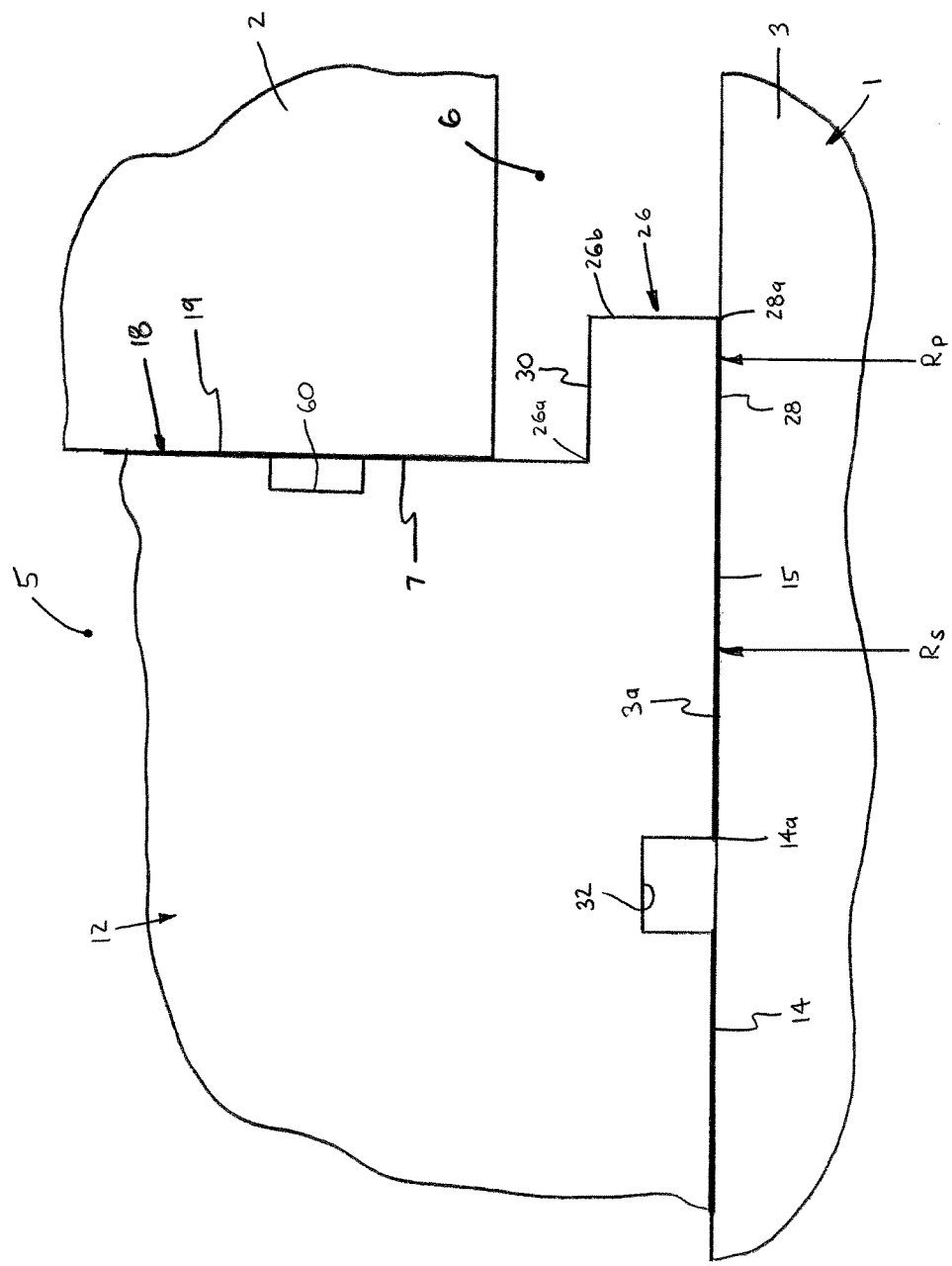
FIG. 5 is a greatly-enlarged, broken-away view of a portion of FIG. 3, showing a lift projection.

As such, during dynamic operating conditions, as the inner member 1 rotates within the seal 11, pressure of the fluid entering each lift ramp 24 of the seal bodies 12 increases, as depicted by the relatively longer arrows in FIG. 6, thereby generating the radially-outwardly directed force $F_R$, which in combination with the projection lift force $F_P$, radially displaces or "lifts" each body 12 from the inner member outer surface 3a by a spacing distance ds (e.g., 0.000070"-0.0003") to establish an annular gap G between the seal 11 and the inner member 1 (see FIG. 4). As is typical with lift-off seal assemblies, a certain leakage of fluid passes through the gap G, but this drawback is more than offset by the increase in seal life enabled by the "contactless" operation of the seal 11. Thus, providing each seal body 12 with a lift projection 26 enables the lift ramps 24 to displace the seal 11 outwardly against higher fluid pressures and/or more quickly displace the seal 11 off of the inner member 1 to minimize potentially damaging sliding contact between the seal body inner surface 14 and the outer surface 3a of the rotating inner member/runner 3. Having described the basic structure and functions of the seal assembly 10, these and additional features are described in further detail below.

Referring now to FIGS. 1, 3, 4, 8-10 and 14, each seal body 12 is preferably formed having generally L-shaped axial cross-sections and includes a first and second, integrally-connected axial portions 40, 42, respectively. The first axial portion 40 provides the first axial end 16 and has a radial end surface 41, an outer circumferential surface 43, and a first radial thickness $t_{R1}$ defined between the outer surface 43 and a first portion 14a (FIG. 8) of the seal inner surface 14 provided by the body first axial portion 40. The body second axial portion 42 is integrally formed with the body first portion 40 and provides the body second axial end 18. The body second portion 42 has a radial end surface 45, an outer circumferential surface 46, and a second radial thickness $t_{R2}$ defined between the outer surface 46 and a second portion 14b (FIG. 8) of the seal inner surface 14 provided by the body second axial portion 42.

The radial thickness $t_{R2}$ of the second axial portion is substantially greater than the radial thickness of the first axial portion $t_{R1}$, such that a ratio of the first axial portion thickness $t_{R1}$ to the second axial portion thickness $t_{R2}$ has a value within a range of between about 0.35 and about 0.60. Further, the two seal body axial portions 40, 42 are preferably relatively sized "axially" such that the seal body first axial portion 40 has an axial width $w_{A1}$ within a range of about thirty percent (30%) of the seal body width $w_{AB}$ and about sixty percent (60%) of the seal body width $w_{AB}$. The relative sizing of the two axial portions 40, 42 of the seal body 12 provides a number of advantages. First, as the second axial end 18 of the seal body 12 is subjected to higher loading, the increased mass at the second end 18 prevents distortion of the seal body 12. Also, as the radial surface 19 on the second axial end 18 sealingly engages with the housing surface 7, having a greater radial dimension (i.e., the radial thickness $t_{R2}$) provides a greater supporting surface area for the next axial force on the seal body 12, to thereby reduce wear due to fretting. Further, reducing the radial thickness $t_{R1}$ of the seal body first axial portion 40 decreases the total mass of the seal body 12, which correspondingly reduces the magnitude of the force required to displace the seal bodies 12 from the inner member outer surface 4 during dynamic operating conditions.

Furthermore, each seal body 12 is preferably sized relatively circumferentially "shorter" compared with previous designs. Specifically, the circumferential length $l_C$ (FIG. 13) of each one of the plurality of seal bodies 12 is preferably selected such that the annular seal 11 includes several seal bodies 12. For example, in a typical seal assembly 10, each seal body 12 preferably has a circumferential length $l_C$ within the range of one and three quarters inches (1.75") and three inches (3"). As such, a seal assembly 10 with a diameter of about five and a half inches (5.5") preferably has seven of the seal bodies 12. By having a greater number of relatively shorter seal bodies 12, each seal body 12 has a greater stiffness in order to reduce the potential for the seal bodies 12 to distort and contact the rotating inner member 1, which would cause wear or even damage to the seal 11.

Referring to FIGS. 7, 8, 10, 12 and 13, the projection 26 of each seal body 12 is generally arcuate and preferably extends substantially the entire circumferential length $l_C$, of the seal body 12, i.e., the length between the seal body first and second circumferential ends 20, 22. However, each projection 26 may alternatively extend for only a portion of the circumferential length $l_C$ or the seal body 12 may include two or more relatively shorter projections 26, as long as the projection(s) 26 are capable of functioning as described herein. Further, each seal body projection 26 is preferably relatively thin, in other words, has a relatively smaller radial thickness $t_P$ (FIG. 8) between the inner and outer surfaces 28, 30, particularly in comparison to the radial thicknesses $t_{R1}$, $t_{R2}$ of the two body axial portions 40, 42.

Figure 8:
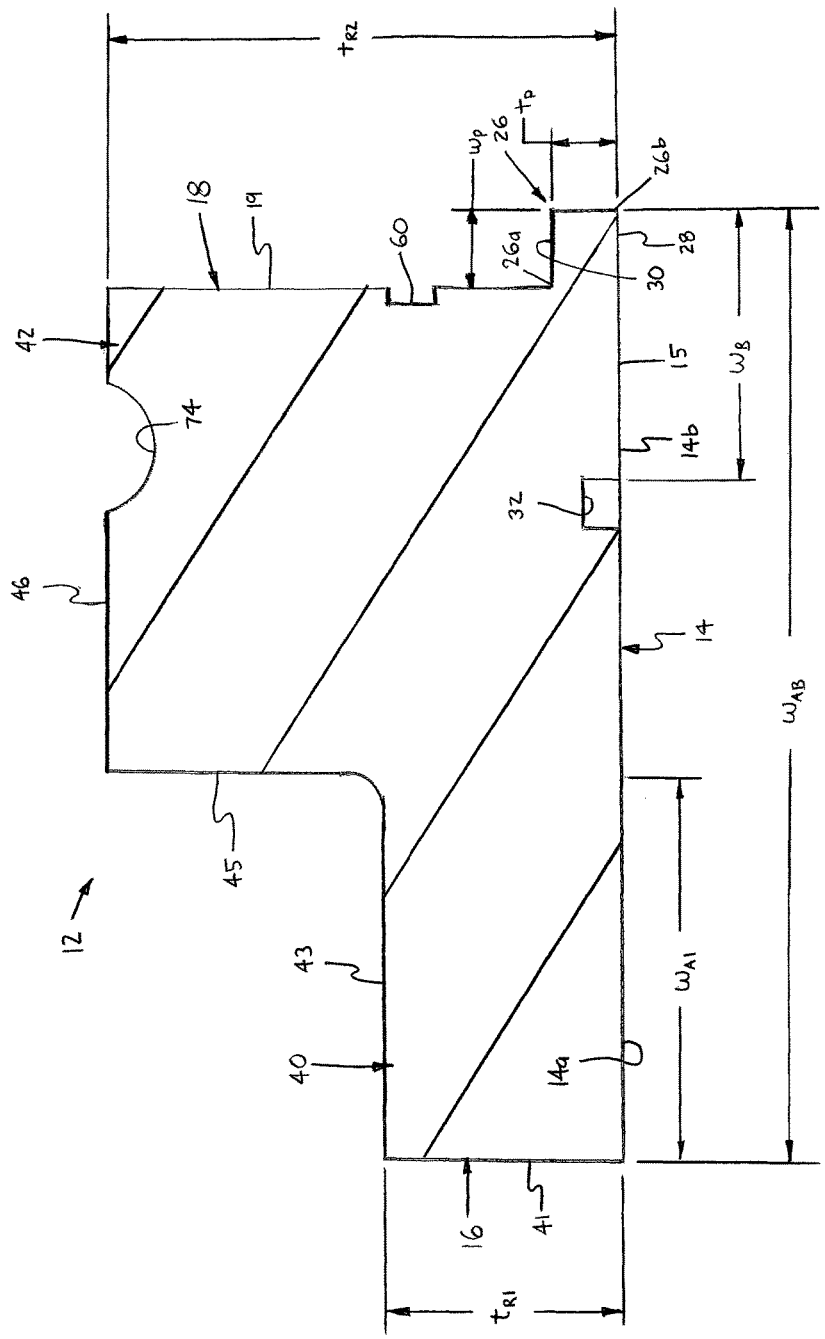
FIG. 8 is an enlarged, axial cross-sectional view of a seal body.
Figure 9:
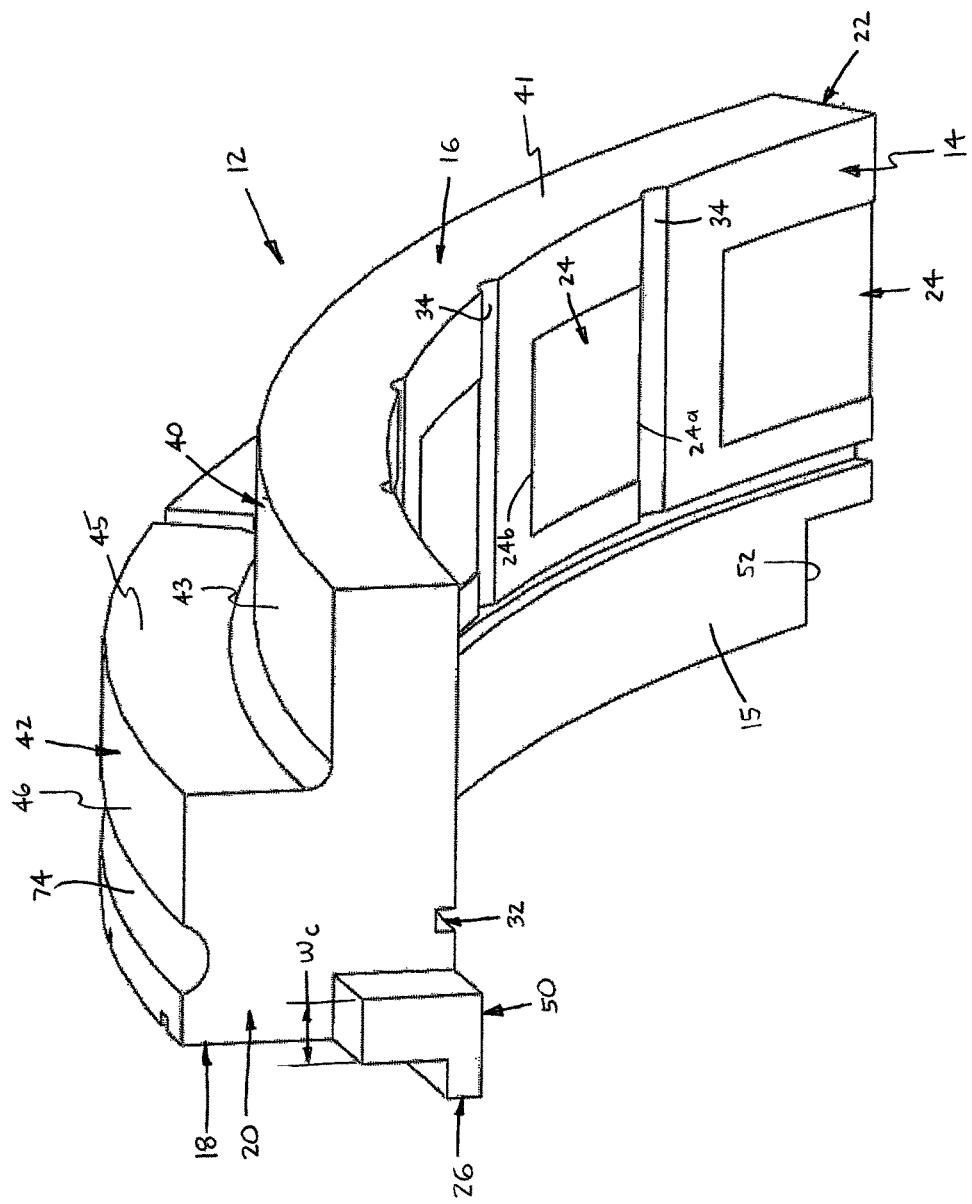
FIG. 9 is a perspective view of the seal body from a first circumferential end.

As indicated in FIG. 8, each projection 26 is preferably sized to have an axial width $w_P$, defined as the width between the projection first and second axial end 26a, 26b, with a value within a range of about thirteen percent (13%)

and about thirty percent (30%) of the bore dam axial width $w_B$ (FIG. 8), i.e., the axial distance between the bore dam inner and outer edges 14a, 28a, as described above. Such a relative projection axial width or length $w_P$ has been determined through analysis and experimentation to provide a sufficient radially-outwardly directed force $F_P$ on the projection 26 (and thus the seal body 12) to assist the lift ramps 24 in lifting the seal body 12 during dynamic conditions, while avoiding excessive outward lift force $F_P$ from a relatively longer axial width $w_P$, which may reduce the effectiveness of sealing about the inner member 1 during static conditions.

Referring to FIGS. 7 and 9-13, each seal body 12 preferably has a circumferential projection 50 extending outwardly from the body first circumferential end 20 and a recess 52 extending circumferentially inwardly from the body second circumferential end 22. The projection 50 of each seal body 12 is disposeable within the recess 52 of an adjacent one of the other seal bodies 12 to form a joint 53 between the two adjacent seal bodies 12 so as to thereby couple together all of the plurality of seal bodies 12, as is known with prior segmented seal assemblies. Another unique feature of the present seal assembly 10 is that the joints 53 are "slim" in comparison with previous segmented seal designs. Specifically, as indicated in FIG. 13, each circumferential projection 52 has as an axial width $w_C$ (FIG. 9) and each recess 53 has an axial width $w_R$ (FIG. 10) that each fall within a range of between about ten percent (10%) and twenty percent (20%) of the axial width $w_{AB}$, and most preferably between about of the twelve and a half percent (12.5%) and seventeen percent (17%). By having "slim" joints 53, the effects of joint loading on the balance of forces acting on the seal bodies 12 is minimized.

Referring to FIGS. 10 and 12, the second axial end 18 of each seal body 12 is preferably formed having an arcuate groove 60 extending axially inwardly from the radial sealing surface 19 and generally circumferentially between the first and second circumferential ends 20, 22, preferably terminating at end positions 60a, 60b spaced inwardly from the body ends 20, 22, respectively. Further, at least one and preferably a plurality of radial grooves 62 each extends axially inwardly from the radial sealing surface 19 and generally radially between the arcuate groove 60 and the outer surface 46 of the seal body second axial portion 42. The radial grooves 62 fluidly couple the arcuate groove 60 with the housing first chamber 5, such that high-pressure fluid within the first chamber 5 flows through the grooves 60 and 62.

As a result, fluid within the grooves 60, 62 exerts a generally axial force $F_{FA2}$ on the seal body 12 to partially counteract the force $F_{FA1}$ exerted on the seal body axial surfaces 41, 45 by fluid in the first chamber 5, as well as a spring biasing force $F_{SA}$ (described below), which both bias the seal body 12 toward the housing radial surface 7. Reducing the net axial force on the seal body 12 reduces friction between the seal body 12 and the housing radial surface 7, thereby decreasing the amount of outward axial force (i.e., from the lift ramps 24 and the projection 26) necessary to displace each seal body 12 from the inner member outer surface 3a. In addition, the reduction in axial force on each seal body 12 also reduces wear on the body 12 caused by fretting of the seal body 12 against the housing radial surface 7.

Figure 14:
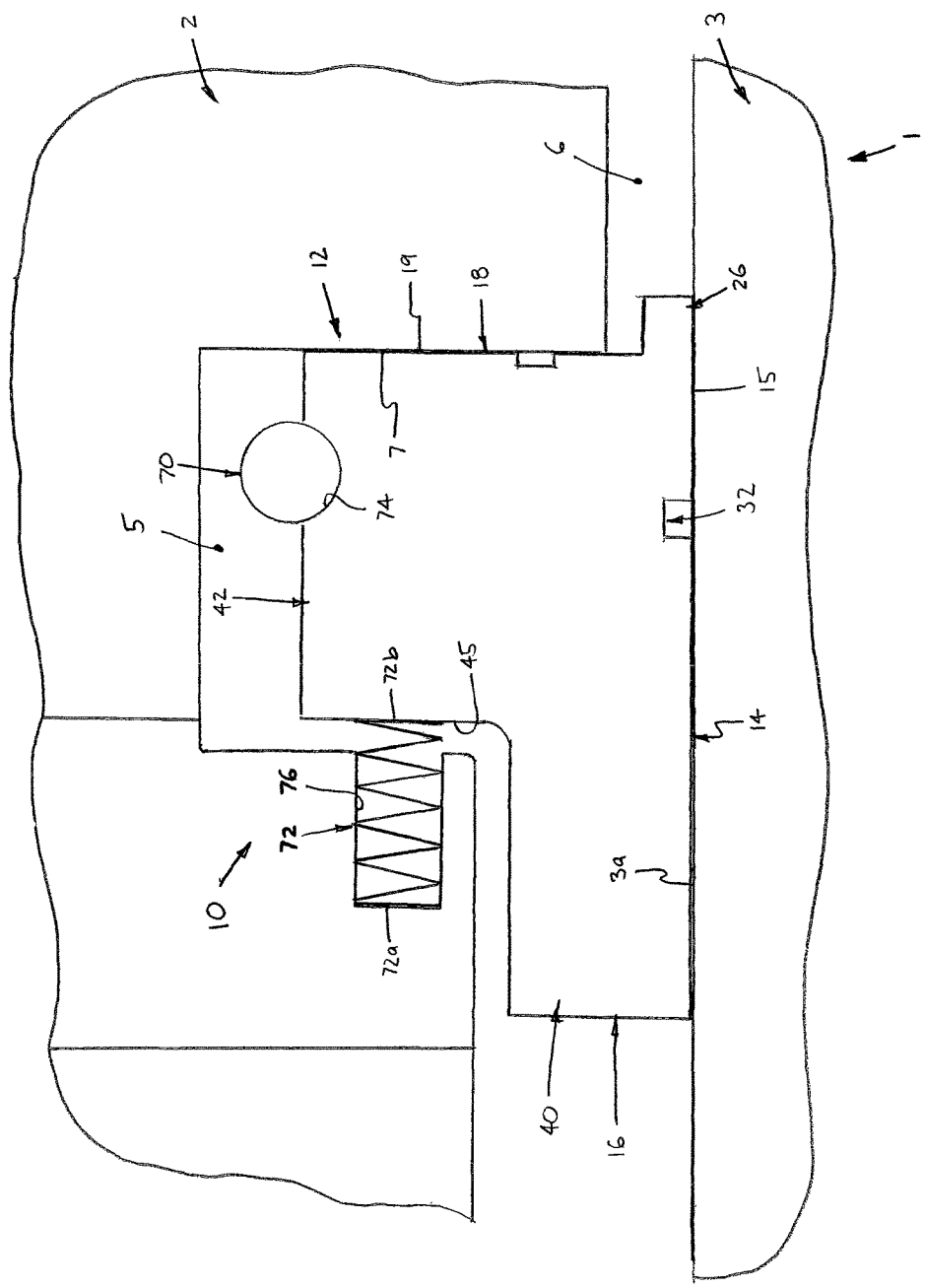
FIG. 14 is another enlarged, broken-away axial cross-sectional view of the seal assembly, showing a coil spring for biasing the seal body axially into engagement with a housing radial surface.

Referring now to FIGS. 1 and 14, the seal assembly 10 preferably further comprises a garter spring 70 and a plurality of coil springs 72. The garter spring 70 is generally annular and is disposed about the plurality of seal bodies 12, specifically within a circumferential groove portion 74 extending radially inwardly from the outer surface 46 of each seal body second axial portion 42. The garter spring 70 is configured to exert a radially-inwardly directed force $F_{SI}$ to bias the seal bodies 12 radially-inwardly toward the central axis $A_C$. As such, the garter spring 70 functions to maintain sealing engagement of each seal body inner surface 14 with the inner member outer surface 3a during static operating conditions (i.e., non-rotational shaft 4).

Further, the plurality of coil springs 72 include at least one spring 72 per seal body 12, and preferably two or more coil springs 72 per seal body 12, and each spring has a first end 72a disposed against or within a portion of the housing 2, such as a spring pocket 76 and a second end 72b disposed against the seal body 12, preferably against the inner radial surface 45 of the seal body second axial portion 42. The plurality of coil springs 72 are each configured to exert an axially-directed spring force $F_{SA}$ on the associated seal body 12 to bias the body 12 generally axially against the housing radial surface 7. Thus, the coil springs 72 function to maintain sealing engagement of the seal body radial surface 19 with the housing radial surface 7 under low pressure operating conditions.

Figure 2:
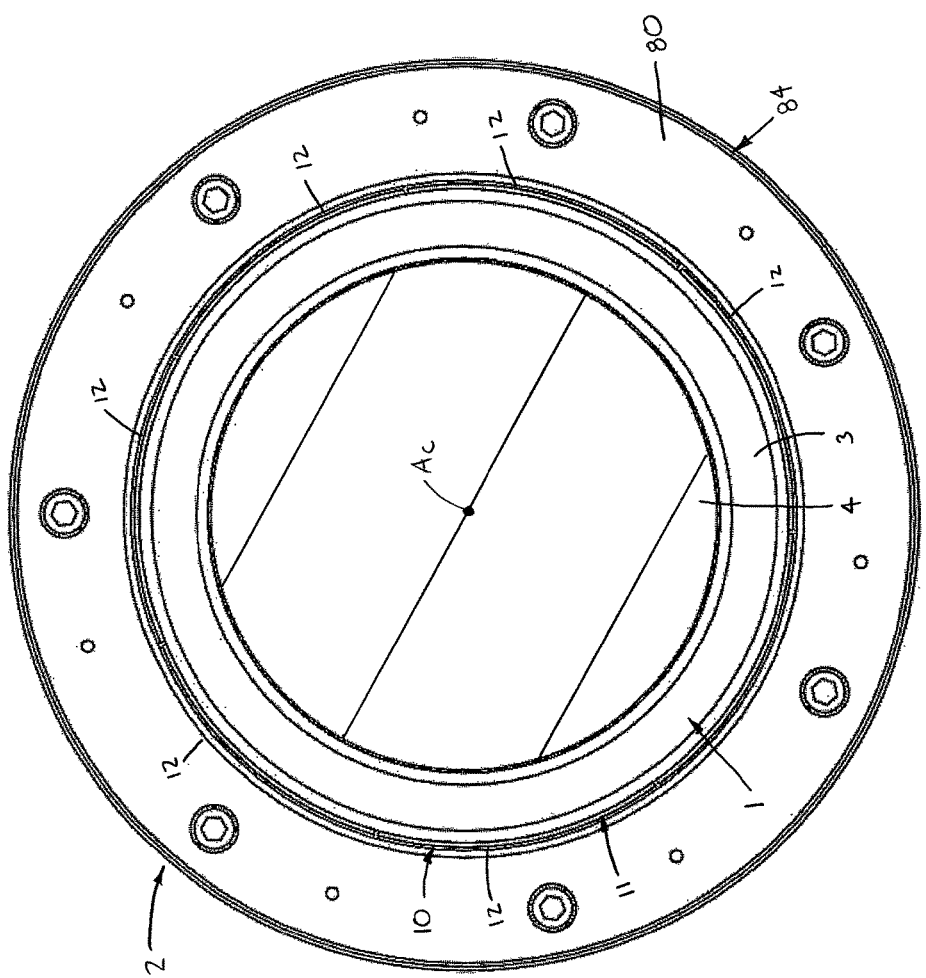
FIG. 2 is a side view of the mechanical assembly of FIG. 1.
Figure 3:
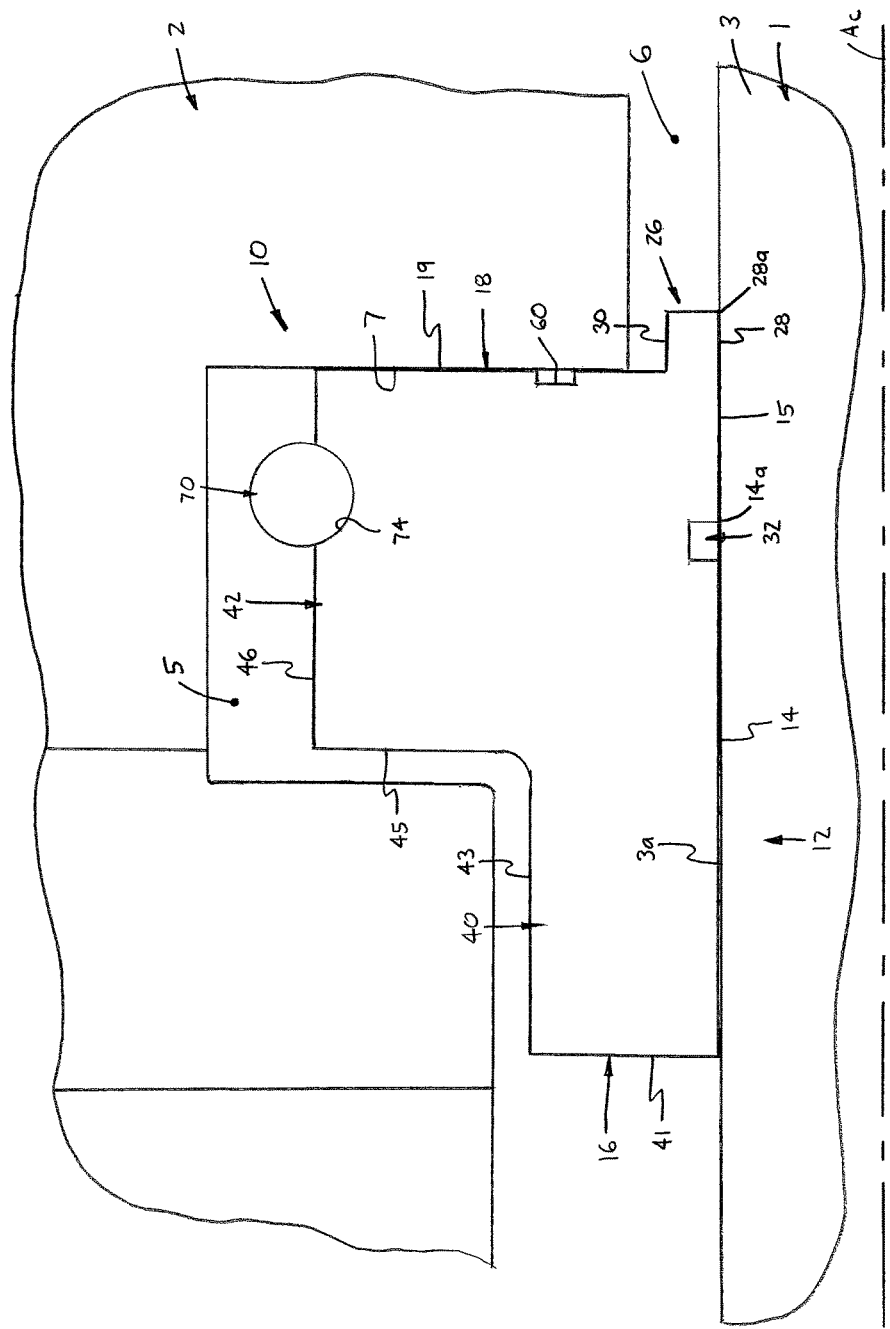
FIG. 3 is an enlarged, broken-away axial cross-sectional view of the seal assembly, showing a seal body in a static state and engaged with an outer surface of an inner rotatable member.
Figure 15:
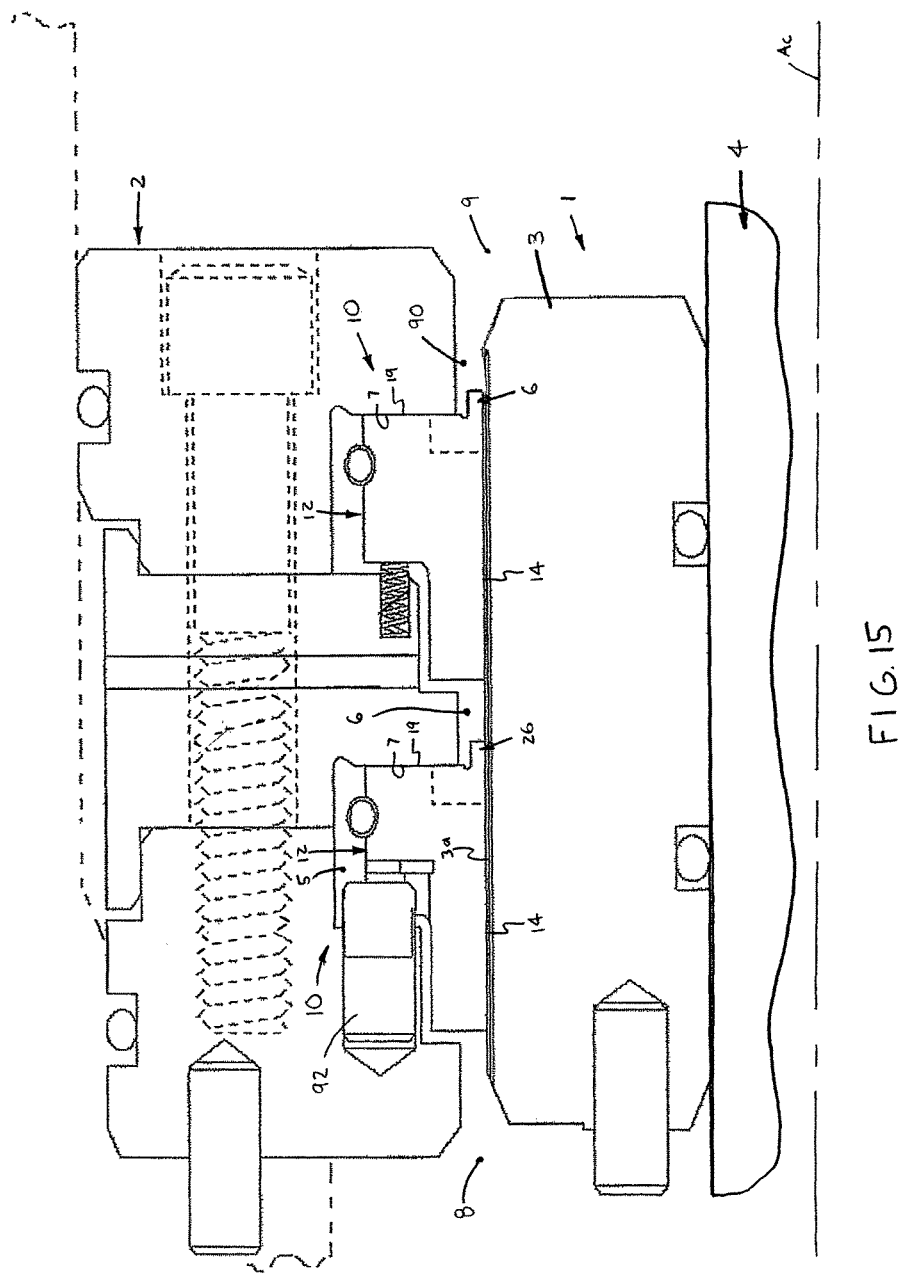
FIG. 15 is a broken-away, axial cross-sectional view of another mechanical assembly including two seal assemblies in accordance with the present invention.

Referring now to FIGS. 1, 2 and 15, each housing 2 is preferably formed of a plurality of generally annular housing members 80, 82 coupled together to form a generally cylindrical seal housing 84. In a presently preferred application, the seal housing 84 is disposeable within a compressor casing (not shown) to mount the seal assembly 10 within the compressor (not shown). The housing members 80, 82 have appropriately sized cylindrical bores 86 to provide the housing chambers 5, 6 and other bores and passages required to circulate fluid within the housing 84 as necessary for operation of the compressor.

Referring specifically to FIG. 15, in an alternative construction, two seal assemblies 10 are provided, a first seal assembly 10 sealing between the first and second housing chambers 5, 6 and the second seal assembly 10 sealing between the second chamber 6 and a third chamber 90. The first chamber 5 contains fluid at a substantially high pressure (e.g., about 300 psig), the third chamber 90 contains fluid generally at ambient pressures, and the second chamber 6 contains fluid at an intermediate pressure between the high pressure and ambient pressure (e.g., 120 psig-180 psig). Otherwise, each one of the two seal assemblies 10 is substantially identically constructed, and functions substantially in the same manner, as described in detail above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A circumferential lift-off seal assembly for sealing generally between an inner member rotatable about a central axis and an outer housing, the inner member having an outer circumferential surface and the housing having a first chamber, a second chamber and a radial surface partially defining the first chamber and located adjacent to the second chamber, the seal assembly comprising:

a plurality of generally arcuate seal bodies spaced circumferentially about the central axis and coupled together to form a generally annular seal disposeable substantially within the housing first chamber, each seal body having an inner circumferential sealing surface sealingly engageable with the inner member outer surface, first and second axial ends, the second axial end having a radial sealing surface sealingly engageable with the housing radial surface so as to fluidly separate the first and second housing chambers, opposing first and second circumferential ends, the first end of each seal body being coupled with the second end of an adjacent one of the other seal bodies, at least one lift ramp extending radially-outwardly from the body inner surface and configured to generate a radially-outwardly directed force on the seal body when the inner member rotatably displaces within the seal, and at least one elongated projection extending generally axially outwardly from the body second axial end and having opposing radially inner and radially outer surfaces, the projection being disposeable within the housing second chamber such that that the projection outer surface is exposable to fluid pressure within the second chamber to generate a pressure differential between the projection inner and outer surfaces;

wherein each seal body further has a circumferential pressure groove extending generally radially-outwardly from the body inner surface and generally between the first and second circumferential ends, the groove being generally disposed axially between the at least one lift ramp and the body second axial end, and a feed slot extending generally axially between the body first end and the pressure groove and fluidly coupled with the at least one lift ramp such that the pressure groove is fluidly coupleable with the first housing chamber such that a pressure gradient extends axially between an edge of the seal body inner surface adjacent to the groove and an edge of the projection inner surface adjacent to the projection outer end when fluid pressure within the first chamber is greater than fluid pressure within the second chamber; and wherein the lift projection of each seal body has a first end integrally formed with the seal body second axial end, a second end spaced axially from the first end and an axial width between the projection first and second ends, a bore dam axial width being defined between an edge of the seal body inner surface adjacent to the pressure groove and the projection outer end, the projection axial width being within the range of about twenty percent of the bore dam width and about thirty percent of the bore dam width.

2. The seal assembly as recited in claim 1 wherein the seal inner surface has a radius and the projection inner surface has a radius substantially equal to the seal inner surface radius such that the projection inner surface is substantially continuous along the axis with at least an adjacent portion of the seal body inner surface.

3. The seal assembly as recited in claim 1 wherein each seal body has a circumferential length between the first and second circumferential ends and the projection of each seal body is generally arcuate and extends substantially the entire body circumferential length.

4. The seal assembly as recited in claim 1 wherein the seal body inner surface has an inside diameter and the projection inner surface has an inside diameter substantially equal to the seal body inside diameter such that the projection inner surface is substantially continuous along the axis with at least an adjacent portion of the seal body inner surface.

5. The seal assembly as recited in claim 1 wherein the seal body has a first axial portion providing the first axial end and having a first radial thickness and a second axial portion integrally formed with the first portion, providing the second axial end and having a radial thickness, the radial thickness of the second axial portion being substantially greater than the radial thickness of the first axial portion.

6. The seal assembly as recited in claim 5 wherein the seal body first axial portion has an outer circumferential surface and a radial thickness defined between the seal body inner surface and the first axial portion outer surface, the seal body second axial portion has an outer circumferential surface and a radial thickness defined between the seal body inner surface and the second axial portion outer surface, a ratio of the first axial portion thickness to the second axial portion thickness having a value in the range of about 0.35 and about 0.60.

7. The seal assembly as recited in claim 5 wherein each seal body has an axial width and the seal body first axial portion has an axial width within a range of about forty percent of the seal body width and about sixty percent of the seal body width.

8. The seal assembly as recited in claim 1 wherein each seal body has a circumferential length between the first and second circumferential ends, the circumferential length of each one of the plurality of seal bodies being selected such that the annular seal includes at least seven seal bodies.

9. The seal assembly as recited in claim 1 further comprising a garter spring disposed about the plurality of seal bodies and configured to bias the seal bodies radially inwardly toward the central axis and a plurality of coil springs each configured to bias one of the seal bodies generally axially against the housing radial surface.

10. The seal assembly as recited in claim 1 wherein each seal body has a circumferential projection extending outwardly from the body first circumferential end and a recess extending circumferentially inwardly from the body second circumferential end, the projection of each seal body being disposeable with the recess of each adjacent body to couple the seal bodies together, each projection having an axial width within a range of about ten percent of an axial width of the seal body and about twenty percent of the seal body axial width.

11. The seal assembly as recited in claim 1 wherein the second axial end of each seal body has an arcuate groove extending axially inwardly from the radial sealing surface and generally circumferentially between the first and second circumferential ends, and a plurality of radial grooves extending axially inwardly from the radial sealing surface and generally radially between the arcuate groove and an outer surface of the seal body to fluidly couple the arcuate groove with the housing second chamber.

12. A circumferential lift-off seal assembly for sealing generally between an inner member rotatable about a central axis and an outer housing, the inner member having an outer circumferential surface and the housing having a first chamber, a second chamber and a radial surface partially defining the first chamber and located generally adjacent to the second chamber, the seal assembly comprising:

a plurality of generally arcuate seal bodies spaced circumferentially about the central axis and coupled together to form a generally annular seal disposeable substantially within the housing first chamber, each seal body having an inner circumferential sealing surface sealingly engageable with the inner member outer surface, first and second axial ends, the second axial end having a radial sealing surface sealingly engageable with the housing radial surface so as to fluidly separate the first and second housing chambers, opposing first and second circumferential ends, the first end of each seal body being coupled with the second end of an adjacent seal body to form the seal, at least one lift ramp extending radially outwardly from the body inner surface, a circumferential pressure groove extending generally radially outwardly from the body inner surface and generally between the first and second circumferential ends, the groove being generally disposed axially between the at least one lift ramp and the body second axial end and being fluidly coupleable with the first housing chamber, and a feed slot extending generally axially between the body first end and the pressure groove and fluidly coupled with the at least one lift ramp, and at least one elongated projection extending generally axially outwardly from the body second axial end and having opposing radially inner and radially outer surfaces, the projection being disposeable within the housing second chamber such that that the projection outer surface is exposable to fluid pressure within the second chamber to generate a pressure differential between the projection inner and outer surfaces;

wherein the lift projection of each seal body has a first end integrally formed with the seal body second axial end, a second end spaced axially from the first end and an axial width between the projection first and second ends, a bore dam axial width being defined between an edge of the seal body inner surface adjacent to the pressure groove and the projection outer end, the projection axial width being with the range of about twenty percent of the bore width and about thirty percent of the bore width.

13. The seal assembly as recited in claim 12 wherein a pressure gradient extends axially between an edge of the seal body inner surface adjacent to the groove and an edge of the projection inner surface adjacent to the projection outer end when fluid pressure within the first chamber is greater than fluid pressure within the second chamber.

14. The seal assembly as recited in claim 12 wherein each seal body has a circumferential length between the first and second circumferential ends and the projection of each seal body is generally arcuate and extends substantially the entire body circumferential length.

15. The seal assembly as recited in claim 12 wherein the seal body has a first axial portion providing the first axial end and having a first radial thickness and a second axial portion integrally formed with the first portion, providing the second axial end and having a radial thickness, the radial thickness of the second axial portion being substantially greater than the radial thickness of the first axial portion.

16. A circumferential lift-off seal assembly for sealing generally between an inner member rotatable about a central axis and an outer housing, the inner member having an outer circumferential surface and the housing having a first chamber, a second chamber and a radial surface partially defining the first chamber and located adjacent to the second chamber, the seal assembly comprising:

a plurality of generally arcuate seal bodies spaced circumferentially about the central axis and coupled together to form a generally annular seal disposeable substantially within the housing first chamber, each seal body having an inner circumferential sealing surface sealingly engageable with the inner member outer surface, first and second axial ends, the second axial end having a radial sealing surface sealingly engageable with the housing radial surface so as to fluidly separate the first and second housing chambers, opposing first and second circumferential ends, the first end of each seal body being coupled with the second end of an adjacent one of the other seal bodies, at least one lift ramp extending radially-outwardly from the body inner surface and configured to generate a radially-outwardly directed force on the seal body when the inner member rotatably displaces within the seal, and at least one elongated projection extending generally axially outwardly from the body second axial end and having opposing radially inner and radially outer surfaces, the projection being disposeable within the housing second chamber such that that the projection outer surface is exposable to fluid pressure within the second chamber to generate a pressure differential between the projection inner and outer surfaces;

wherein each seal body further has a circumferential pressure groove extending generally radially-outwardly from the body inner surface and generally between the first and second circumferential ends, the groove being generally disposed axially between the at least one lift ramp and the body second axial end, and a feed slot extending generally axially between the body first end and the pressure groove and fluidly coupled with the at least one lift ramp such that the pressure groove is fluidly coupleable with the first housing chamber such that a pressure gradient extends axially between an edge of the seal body inner surface adjacent to the groove and an edge of the projection inner surface adjacent to the projection outer end when fluid pressure within the first chamber is greater than fluid pressure within the second chamber; and wherein each seal body includes a plurality of lift ramps and a plurality of axial feed slots, each feed slot being fluidly coupled with a separate one of the lift ramps and with the pressure groove.

17. A circumferential lift-off seal assembly for sealing generally between an inner member rotatable about a central axis and an outer housing, the inner member having an outer circumferential surface and the housing having a first chamber, a second chamber and a radial surface partially defining the first chamber and located adjacent to the second chamber, the seal assembly comprising:

a plurality of generally arcuate seal bodies spaced circumferentially about the central axis and coupled together to form a generally annular seal disposeable substantially within the housing first chamber, each seal body having an inner circumferential sealing surface sealingly engageable with the inner member outer surface, first and second axial ends, the second axial end having a radial sealing surface sealingly engageable with the housing radial surface so as to fluidly separate the first and second housing chambers, opposing first and second circumferential ends, the first end of each seal body being coupled with the second end of an adjacent one of the other seal bodies, at least one lift ramp extending radially-outwardly from the body inner surface and configured to generate a radially-outwardly directed force on the seal body when the inner member rotatably displaces within the seal, and at least one elongated projection extending generally axially outwardly from the body second axial end and having opposing radially inner and radially outer surfaces, the projection being disposeable within the housing second chamber such that that the projection outer surface is exposable to fluid pressure within the second chamber to generate a pressure differential between the projection inner and outer surfaces;

wherein the seal body has a first axial portion providing the first axial end and having a first radial thickness and a second axial portion integrally formed with the first portion, providing the second axial end and having a radial thickness, the radial thickness of the second axial portion being substantially greater than the radial thickness of the first axial portion; and wherein the seal body first axial portion has an outer circumferential surface and a radial thickness defined between the seal body inner surface and the first axial portion outer surface, the seal body second axial portion has an outer circumferential surface and a radial thickness defined between the seal body inner surface and the second axial portion outer surface, a ratio of the first axial portion thickness to the second axial portion thickness having a value in the range of about 0.35 and about 0.60.

18. A circumferential lift-off seal assembly for sealing generally between an inner member rotatable about a central axis and an outer housing, the inner member having an outer circumferential surface and the housing having a first chamber, a second chamber and a radial surface partially defining the first chamber and located adjacent to the second chamber, the seal assembly comprising:

a plurality of generally arcuate seal bodies spaced circumferentially about the central axis and coupled together to form a generally annular seal disposeable substantially within the housing first chamber, each seal body having an inner circumferential sealing surface sealingly engageable with the inner member outer surface, first and second axial ends, the second axial end having a radial sealing surface sealingly engageable with the housing radial surface so as to fluidly separate the first and second housing chambers, opposing first and second circumferential ends, the first end of each seal body being coupled with the second end of an adjacent one of the other seal bodies, at least one lift ramp extending radially-outwardly from the body inner surface and configured to generate a radially-outwardly directed force on the seal body when the inner member rotatably displaces within the seal, and at least one elongated projection extending generally axially outwardly from the body second axial end and having opposing radially inner and radially outer surfaces, the projection being disposeable within the housing second chamber such that that the projection outer surface is exposable to fluid pressure within the second chamber to generate a pressure differential between the projection inner and outer surfaces;

wherein the seal body has a first axial portion providing the first axial end and having a first radial thickness and a second axial portion integrally formed with the first portion, providing the second axial end and having a radial thickness, the radial thickness of the second axial portion being substantially greater than the radial thickness of the first axial portion; and wherein each seal body has an axial width and the seal body first axial portion has an axial width within a range of about forty percent of the seal body width and about sixty percent of the seal body width.

19. A circumferential lift-off seal assembly for sealing generally between an inner member rotatable about a central axis and an outer housing, the inner member having an outer circumferential surface and the housing having a first chamber, a second chamber and a radial surface partially defining the first chamber and located adjacent to the second chamber, the seal assembly comprising:

a plurality of generally arcuate seal bodies spaced circumferentially about the central axis and coupled together to form a generally annular seal disposeable substantially within the housing first chamber, each seal body having an inner circumferential sealing surface sealingly engageable with the inner member outer surface, first and second axial ends, the second axial end having a radial sealing surface sealingly engageable with the housing radial surface so as to fluidly separate the first and second housing chambers, opposing first and second circumferential ends, the first end of each seal body being coupled with the second end of an adjacent one of the other seal bodies, at least one lift ramp extending radially-outwardly from the body inner surface and configured to generate a radially-outwardly directed force on the seal body when the inner member rotatably displaces within the seal, and at least one elongated projection extending generally axially outwardly from the body second axial end and having opposing radially inner and radially outer surfaces, the projection being disposeable within the housing second chamber such that that the projection outer surface is exposable to fluid pressure within the second chamber to generate a pressure differential between the projection inner and outer surfaces;

wherein the second axial end of each seal body has an arcuate groove extending axially inwardly from the radial sealing surface and generally circumferentially between the first and second circumferential ends, and a plurality of radial grooves extending axially inwardly from the radial sealing surface and generally radially between the arcuate groove and an outer surface of the seal body to fluidly couple the arcuate groove with the housing second chamber.

* * * * *